United States Patent [19]
Hindermann

[11] 3,812,956
[45] May 28, 1974

[54] SCREW CONVEYOR
[76] Inventor: Erich A. Hindermann, Bockumer Str. 99a, Dusseldorf-Wittlaer, Germany
[22] Filed: Feb. 10, 1972
[21] Appl. No.: 225,326

Related U.S. Application Data
[63] Continuation of Ser. No. 888,349, Dec. 29, 1969, abandoned.

[30] Foreign Application Priority Data
July 29, 1969 Germany............................ 1938370

[52] U.S. Cl. ............................................. 198/213
[51] Int. Cl. ............................................ B65g 33/00
[58] Field of Search ............................ 198/213, 214

[56] References Cited
UNITED STATES PATENTS
2,789,738  4/1957  Hall et al. ....................... 198/213 X
2,954,261  9/1960  Taupin ........................... 198/213 X FOREIGN PATENTS OR APPLICATIONS
1,135,909  12/1958  Great Britain ..................... 198/213

Primary Examiner—Richard E. Aegerter
Assistant Examiner—Douglas D. Watts
Attorney, Agent, or Firm—Owen, Wickersham & Erickson

[57] ABSTRACT

A worm conveyor in which two conveying helices are mounted inside each other in a flexible tube. Both helices have a pitch in the same sense, and both rotate in the same direction. Preferably the pitch of the inner helix is about 10 percent greater than that of the outer helix and it also rotates somewhat faster. When starting, the inner helix is preferably started first, then the outer helix and apparatus for doing this are included.

5 Claims, 3 Drawing Figures

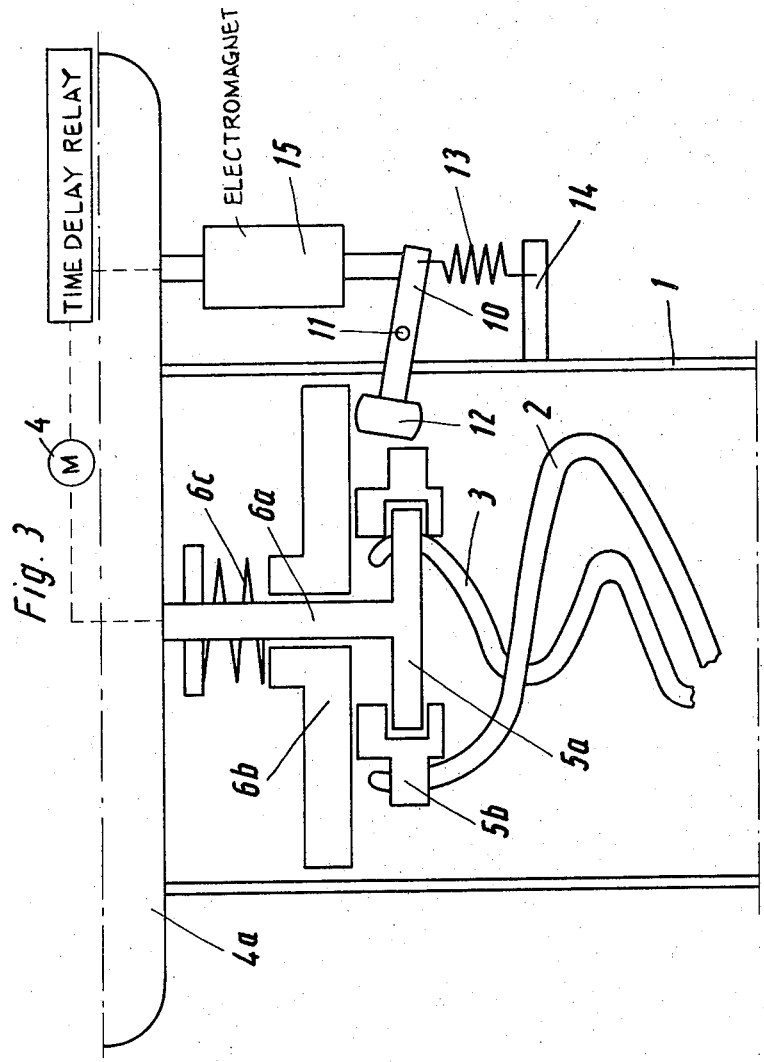

SCREW CONVEYOR

This is a continuation of application Ser. No. 888,349, filed Dec. 29, 1969 now abandoned.

This invention relates to an improved worm conveyor of the type having a plurality of rotatable flexible conveying helices.

Worm conveyors are already known in which the conveying element comprises two conveying helices of opposite pitch; in these conveyors the two helices are rotated in opposite directions. This prior art conveying apparatus suffers from the serious disadvantage that the material to be conveyed is to a considerable extent crushed or destroyed. Therefore, it has not hitherto been possible to use such apparatus for conveying leguminous vegetables, coffee beans, cocoa beans, tablets, and similar substances, because with these materials it is important to avoid abrasion or other damage during the conveying operation.

A further disadvantage of the prior art apparatus is that the driving system for the conveying helices which has two opposite directions of rotation requires either expensive twin motors or the intercalation of gearing. In addition, part of the driving energy is consumed by the continuous friction between the helices rotating in opposite directions, and an unwelcome degree of noise is produced.

One object of the present invention is to overcome the above disadvantages in a worm conveyor without reducing the efficiency of the apparatus, by comparison with those already known, and, in fact to render it still more efficient in its conveying action.

In the present invention, the two conveying helices are mounted one inside the other within a tube and both of them rotate in the same angular direction; also both helices have a pitch of the same sense. Preferably, the pitch of the inner helix is greater than that of the outer helix, for with that structure the material carried along by the inner helix, is transferred to the outer helix, and the outer helix, is always kept filled to the optimum extent. At the same time the inner helix prevents considerable parts of the material from remaining behind in the middle or from falling back, when being conveyed upwards. Thus, it has been found desirable to make the pitch of the inner helix about 10 percent greater than that of the outer helix.

Preferably, the inner conveying helix is arranged to be driven at a greater rotational speed than the outer helix. This speed difference intensifies the effect already mentioned, i.e., that the material is transferred from the central zone of the tube or hose to the outer helix, as is already the case, owing to the greater pitch of the inner helix.

To enable the two helices to be driven at different rotational speeds, a suitable gearing may be intercalated, if only one driving motor is provided. Alternatively, by using two independent driving devices, e.g., an electric motor of the "twin" type, it becomes possible to drive the inner helix at a higher speed than the outer helix by appropriately connecting and controlling the motor parts.

In an advantageous further development of the invention, the outer helix may be driveably connected to a driving device via a disengageable coupling arrangement. When both helices are set in rotation by a driving motor, a detachable coupling is installed between the drive and the outer helix. It is then possible, when starting up, for the inner helix to be started first, and afterwards to start the outer helix. This procedure insures that, after temporarily shutting off the apparatus, the entire column of material does not have to be accelerated all at once. The starting torque is thus kept lower.

The conveying helices can be caused to start up in succession to each other automatically by a system in which a coupling is used for the outer helix and this coupling is always closed a certain time after the inner helix has started up; this result can be obtained by means of a relay connected with a timing member. An arrangement of this kind can also be adopted in cases in which two separate driving devices are installed for the two helices.

Other objects and advantages of the invention will appear from the following description of a preferred form of the invention, by way of example only, with reference to the accompanying drawings.

In the drawings:

FIG. 3 is a fragmentary enlarged view of a modified form of the invention.

Figure 1:
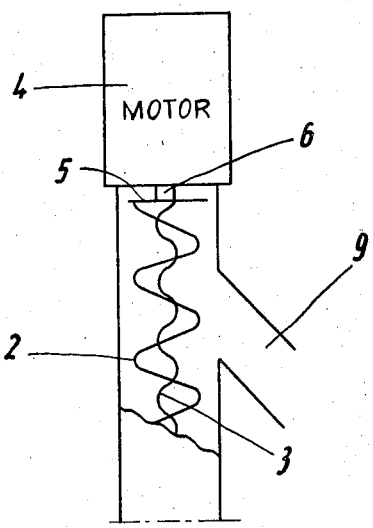
FIG. 1 is a diagrammatic cross-sectional view of a worm conveyor embodying the principles of the invention.
Figure 1:
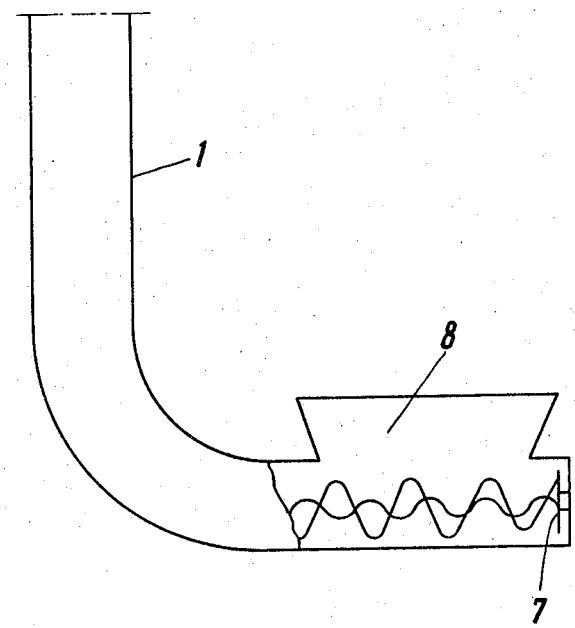
Figure 2:
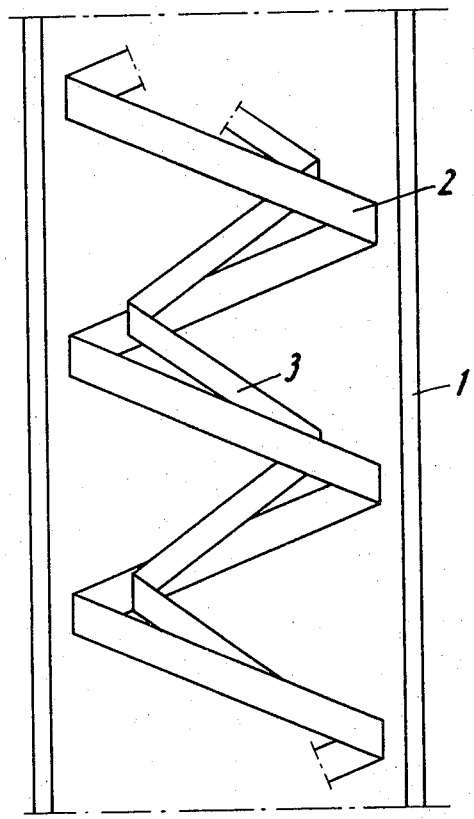
FIG. 2 is a fragmentary enlarged view of a portion only of the device of FIG. 1, with the conveyors broken off earlier than the tube.

The worm conveyor shown in FIG. 1 comprises a preferably flexible tube or hose 1 containing two conveying helices 2 and 3, situated one inside the other. The internal diameter of the external conveying helix 2 is somewhat greater than the external diameter of the inner helix 3. Both helices are wound in the same sense, and are also driven in the same direction of rotation. The pitch of the inner conveying helix 3 is somewhat greater than that of the outer helix 2, preferably about 10 percent greater. The position of the helices 2 and 3 in relation to each other and to the tube or hose 1 is shown in FIG. 2, on a larger scale.

The conveying helices 2 and 3 are driven by an electric motor 4, roughly indicated schematically, which is situated at one end of the tube or hose 1. The shaft 6 of the motor 4 bears a disc 5 to which the ends of the conveying helices 2 and 3 are affixed eccentrically with respect to the shaft 6. In a corresponding manner the opposite ends of the conveying helices 2 and 3 are rotatably mounted to a disc 7 in or below a feed hopper 8 by which the material to be conveyed is fed to the apparatus. The material leaves the hose or tube 1 via an outlet 9 in the general vicinity of the motor 4.

It is advisable, when starting up, to switch on the inner helix 3 first, the outer helix 2 not being set in rotation until after a short time has elapsed. This result can be achieved in various ways. One such way, for example, is shown in FIG. 3, where the result is achieved with the aid of a coupling mounted between the driving shaft of the motor and the outer helix 2. As shown in FIG. 3, a motor shaft 6a is rigidly connected to a disc 5a to which the end of the inner conveying helix 3 is eccentrically affixed. An annular member 5 b, to which the end of the outer conveying helix 2 is affixed, again eccentrically with respect to the motor shaft 6a, is rotatably mounted on the disc 5a. A clutch disc 6b is nonrotatably mounted on the motor shaft 6a so as to be axially displaceable; this clutch disc 6b can be pressed against clutch surfaces provided on the annular member 5b. Between a collar affixed to the motor shaft 6a and the end face of the clutch disc 6b is a spring 6c by which the clutch disc 6b is urged against the annular member 5b. The coupling is released by a lever 10, which passes through the tube or hose 1 to the outside and is mounted on a pivot 11; the lever 10 engages, via a roller 12, the lower side of the clutch disc 6b. When that end of the lever 10 which is situated on the right as seen in the drawing is moved downwards, the roller 12 moves the clutch disc 6b away from the annular member 5b, and the outer conveying helix 2 is not driven. If, on the other hand, that end of the lever 10 which is provided with the roller 12 is lowered, the spring 6c presses the clutch disc 6b against the annular member 5b, and the conveying helix 2 is driven.

FIG. 3 also provides a schematic diagram of an arrangement by which the coupling is automatically opened and closed. Between that end of the lever 10 which is situated opposite to the roller 12 and a bracket 14 rigidly mounted on the hose or tube 1, is provided a draw spring 13, the force of which exceeds that of the spring 6c. Between the same end of the lever 10 and the housing of the motor 4a, an electromagnet 15 is provided, which, owing to the installation of a suitable timing member, not shown, is energized only after the lapse of a certain period after the motor 4a has been started; then the electromagnet 15 raises the lever 10 in opposite to the force of the spring 13. The clutch 6b, 5b, thus closes under the action of the spring 6c. As soon as the drive is switched off the electromagnet 15 likewise becomes inactive, and the spring 13 separates the coupling, so that the next time the motor 4 is switched on, it will at first start only the inner helix 3, the outer helix 2 being actuated later on. Needless to say, the system shown schematically in FIG. 3 can be constructed in a variety of different ways.

Owing to the fact that the inner conveying helix 3 has a greater pitch and possibly a higher speed of rotation, the material being conveyed is moved more rapidly in the inner zone and at the same time is urged outwardly. In this position it is taken up by the outer conveying helix 2 and carried along with it. As both conveying helices 2 and 3 rotate in the same direction, the particles of material are not damaged when passing from the inner helix 3 to the outer conveying helix 2. As the helices have different pitches, they guide each other but nevertheless do not get caught in each other if the pipe or hose 1 is not straight. In contradistinction to the known single-spiral apparatus, the performance of which is unsatisfactory even at a high speed of rotation, and which causes serious damage to sensitive material being conveyed, the apparatus of this invention enables considerably greater "transport lengths" to be adopted, with a comparatively smaller consumption of energy.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A worm conveyor comprising:
a conduit tube,
two conveying helices in said tube, one mounted inside the other with no intervening structure, both helices having a pitch of the same sense, the pitch of the inner helix being greater than that of the outer helix, and
means for rotating both helices in the same angular direction, with the inner helix being driven at a speed which is at least as great as the outer helix, the pitch of the inner helix being about 10 percent greater than that of the outer helix,
said means for rotating both helices including means for driving the inner helix at a substantially greater rotational speed than the outer helix.

2. The worm conveyor according to claim 1 having start-up means connected to said means for rotating for starting the drive to said inner helix first, said starting means then operating after a fixed time interval, to automatically start said outer helix.

3. A worm conveyor comprising:
a conduit tube,
two conveying helices in said tube, one mounted inside the other with no intervening structure, both helices having a pitch of the same sense, the pitch of the inner helix being greater than that of the outer helix, and
means for rotating both helices in the same angular direction, with the inner helix being driven at a speed which is at least as great as the outer helix, the pitch of the inner helix being about 10 percent greater than that of the outer helix,
said means for starting comprising a motor and a direct drive connection between said motor and said inner helix, clutch means between said motor and said outer helix, and means for operating the clutch to connect the outer helix and motor a predetermined time after starting the motor.

4. A worm conveyor comprising:
a conduit tube,
two conveying helices in said tube, one mounted inside the other, both helices having a pitch of the same sense, the pitch of the inner helix being greater than that of the outer helix,
means for rotating both helices in the same angular direction, and
start-up means connected to said means for rotating, for starting the drive to said inner helix first and then, after a time interval, starting said outer helix, said start-up means comprising
a motor,
a direct drive connection between said motor and said inner helix,
clutch means between said motor and said outer helix,
time-delay means actuated by said motor when it starts, and
clutch-actuating means actuated by said time-delay means after a time lapse.

5. A worm conveyor comprising:
a conduit tube,
two conveying helices in said tube, one mounted inside the other with no intervening structure, both helices having a pitch of the same sense, the pitch of the inner helix being greater than that of the outer helix,
means for rotating both helices in the same angular direction, with the inner helix being driven at a speed which is at least as great as the outer helix, the pitch of the inner helix being about 10 percent greater than that of the outer helix, and
start-up means connected to said means for rotating for starting the drive to said inner helix first, said starting means then operating after a fixed time interval to automatically start said outer helix.

* * * * *